US008081593B2

(12) United States Patent
Bright et al.

(10) Patent No.: US 8,081,593 B2
(45) Date of Patent: Dec. 20, 2011

(54) MOBILE SWITCHING CENTER WITH OUTGOING ACCESS CLOSED USER GROUP INTERLOCK CODE

(75) Inventors: Penny L. Bright, Naperville, IL (US); Latika Khanna, Naperville, IL (US)

(73) Assignee: Alcatel Lucent, Paris (FR)

( * ) Notice: Subject to any disclaimer, the term of this patent is extended or adjusted under 35 U.S.C. 154(b) by 1171 days.

(21) Appl. No.: 11/824,380

(22) Filed: Jun. 29, 2007

(65) Prior Publication Data

US 2009/0003382 A1    Jan. 1, 2009

(51) Int. Cl.
*H04H 20/71* (2008.01)
(52) U.S. Cl. ........................................ 370/312
(58) Field of Classification Search .......... 370/473, 370/352, 390, 238, 413; 455/406, 428, 445, 455/417, 518, 433, 461, 519, 565; 379/211; 725/30, 87, 93
See application file for complete search history.

(56) References Cited

U.S. PATENT DOCUMENTS

| | | | |
|---|---|---|---|
| 5,574,904 A * | 11/1996 | Yunoki et al. | 1/1 |
| 5,987,520 A * | 11/1999 | Libby et al. | 709/238 |
| 6,122,510 A * | 9/2000 | Granberg | 455/433 |
| 6,466,786 B1 * | 10/2002 | Wallenius | 455/433 |
| 6,501,948 B1 * | 12/2002 | Salin | 455/417 |
| 6,628,937 B1 * | 9/2003 | Salin | 455/413 |
| 6,633,755 B1 * | 10/2003 | Haumont | 455/406 |
| 7,496,372 B1 * | 2/2009 | Haapala et al. | 455/518 |
| 2002/0131407 A1 * | 9/2002 | Muhonen | 370/352 |

OTHER PUBLICATIONS

3GPP Organizational Partners (ARIB, CWTS, ETSI, T1, TTA, TTC), 3rd Generation Partnership Project; Technical Specification Group Services and System Aspects; Closed User Group (CUG) Supplementary Services-Stage 1), 1999, 3GPP, V3.1.0, entire document.*
CISCO, Specification Signalling System No. 7 Interconnect ISUP, Feb. 1998, ACIF G500, Version 1.0, entire document.*

* cited by examiner

*Primary Examiner* — Hassan Phillips
*Assistant Examiner* — Prenell Jones
(74) *Attorney, Agent, or Firm* — Carmen Patti Law Group, LLC

(57) ABSTRACT

A mobile switching center of an apparatus in one example is configured to provide a closed user group (CUG) supplementary service to a mobile communication device. The mobile communication device is a member of a default CUG and is not provisioned for outgoing access. The mobile switching center is configured to provide a plurality of CUG interlock codes that correspond to a plurality of closed user groups (CUGs). The plurality of CUG interlock codes comprise at least one outgoing access (OA) CUG interlock code. The mobile switching center is configured to provide a default behavior according to the default CUG for an outgoing call from the mobile communication device. The mobile switching center is configured to provide outgoing access to the mobile communication device for the outgoing call if a setup message from the mobile communication device for the outgoing call comprises a request for the OA CUG interlock code.

23 Claims, 2 Drawing Sheets

MOBILE SWITCHING CENTER WITH OUTGOING ACCESS CLOSED USER GROUP INTERLOCK CODE

TECHNICAL FIELD

The invention relates generally to telecommunications and more particularly to closed user groups.

BACKGROUND

Current Global Special Mobile (GSM) and Universal Mobile Telecommunication System (UMTS) standards define a closed user group (CUG) for telecommunications that is based on the integrated services digital network (ISDN) CUG feature. In one example, a subscriber that is a member of a CUG may get a special or reduced billing rate for calls made to other subscribers within the CUG. In other examples, a member of a CUG may have restricted access such that only calls to other members of the CUG are allowed. The member of the CUG may be additionally provisioned with an outgoing access (OA) capability to allow outgoing calls to non-CUG members. However, all outgoing calls from this subscriber would be flagged with the OA capability, which complicates the processing of the special billing rate for the subscriber.

Thus, a need exists for simplified billing of outgoing access calls for CUG subscribers.

SUMMARY

The invention in one implementation encompasses an apparatus. The apparatus in one example comprises a mobile switching center that is configured to provide a closed user group (CUG) supplementary service to a mobile communication device. The mobile communication device is a member of a default CUG and is not provisioned for outgoing access (OA). The mobile switching center is configured to provide a plurality of CUG interlock codes that correspond to a plurality of closed user groups (CUGs). The plurality of CUG interlock codes comprise at least one outgoing access (OA) CUG interlock code. The mobile switching center is configured to provide a default behavior according to the default CUG for an outgoing call from the mobile communication device. The mobile switching center is configured to provide outgoing access to the mobile communication device for the outgoing call if a setup message from the mobile communication device for the outgoing call comprises a request for the OA CUG interlock code.

Another implementation of the invention encompasses a method. A call setup message is received for an outgoing call from a mobile communication device. The mobile communication device is a member of a default closed user group (CUG) and is not provisioned for outgoing access. The call setup message comprises a request for an outgoing access (OA) CUG interlock code. A database lookup is performed to determine that the OA CUG interlock code is valid for the mobile communication device. The outgoing call is established for the mobile communication device. A billing record is generated for the outgoing call at an outgoing billing rate that is distinct from a default CUG billing rate.

A further implementation of the invention encompasses an article. The article comprises one or more computer-readable signal-bearing media. The article comprises means in the one or more media for receiving a call setup message for an outgoing call from a mobile communication device. The mobile communication device is a member of a default closed user group (CUG) and is not provisioned for outgoing access. The call setup message comprises a request for an outgoing access (OA) CUG interlock code. The article comprises means in the one or more media for performing a database lookup to determine that the OA CUG interlock code is valid for the mobile communication device. The article comprises means in the one or more media for establishing the outgoing call for the mobile communication device. The article comprises means in the one or more media for generating a billing record for the outgoing call at an outgoing billing rate that is distinct from a default CUG billing rate.

DESCRIPTION OF THE DRAWINGS

Features of example implementations of the invention will become apparent from the description, the claims, and the accompanying drawings in which:

DETAILED DESCRIPTION

In the prior art, the subscriber needed to be provisioned for outgoing access (OA) to make an outgoing call to a non-CUG subscriber. Outgoing access was provisioned for an entire basic service group (BSG), such as speech, asynchronous data, synchronous data, or facsimile. For billing purposes, all outgoing calls from the subscriber were flagged as Outgoing Access by default, unless the subscriber manually requested to suppress the outgoing access with a Suppress Outgoing Access (SOA) indication. This approach requires the user to manually intervene to make an outgoing call to a member of the CUG without having the billing record be flagged for outgoing access. In addition, a subscriber that is not provisioned with outgoing access may not make any outgoing calls to non-CUG users.

Figure 1:
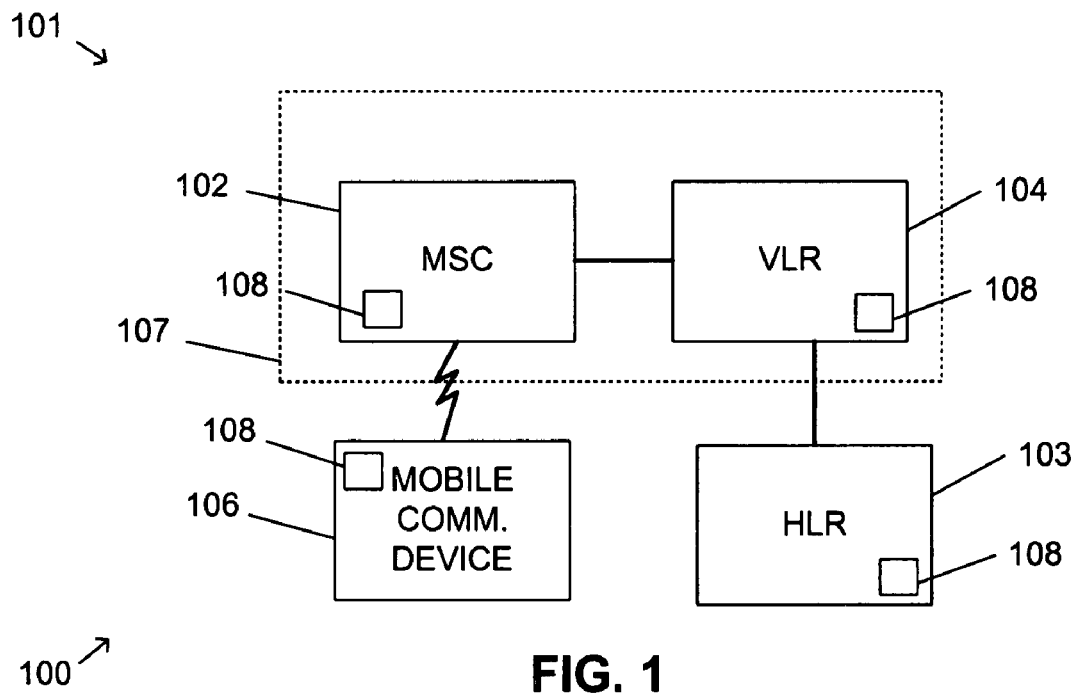
FIG. 1 is a representation of one implementation of an apparatus that comprises a mobile switching center, a home location register, a visitor location register, and a mobile communication device.

Turning to FIG. 1, an apparatus 100 in one embodiment comprises a mobile switching center (MSC) 102, a home location register (HLR) 103, a visitor location register (VLR) 104, and a mobile communication device 106. The MSC 102, HLR 103, and VLR 104 in one example are part of a communication network 101, for example, a wireless or landline communication network. The MSC 102 and the VLR 104 in one example comprise an integral component, for example a switch 107, as will be appreciated by those skilled in the art. The MSC 102, HLR 103, VLR 104, and mobile communication device 106 comprise instances of a recordable data storage medium 108, as described herein. The MSC 102, HLR 103, and VLR 104 provide a wireless communication service to the mobile communication device 106. The wireless communication service in one example is based on the Global Special Mobile (GSM) or Universal Mobile Telecommunication System (UMTS) standards. The MSC 102 in one example is configured to provide a closed user group (CUG) supplementary service to the mobile communication device 106. In a further example, the CUG supplementary service is compliant with the 3rd Generation Partnership Project (3GPP) technical specifications for Closed User Group (CUG) Supplementary Services TS 22.085, TS 23.085, and TS 24.085, the contents of which are incorporated herein by reference. The MSC 102, HLR 103 and VLR 104 in one example communicate via integrated services digital network user part (ISUP) signaling protocols to other networks, for example, additional instances of the communication network 101 or other communication networks.

The HLR 103 in one example is provisioned with a plurality of CUG interlock codes that correspond to a plurality of closed user groups (CUGs). The HLR 103 in a further example stores subscriber profiles. The HLR 103 in one example sends information for the subscriber profile and CUGs to the VLR 104, for example, upon registration of the mobile communication device 106 at the MSC 102/VLR 104, as will be appreciated by those skilled in the art. A subscriber that uses the mobile communication device 106 may be a member of one or more CUGs. When placing an outgoing call, the subscriber may invoke a CUG call either implicitly or explicitly. In one example, the subscriber has a default CUG that is implicitly used for a default behavior of calls terminating to and originating from the mobile communication device 106. In one example, the default CUG comprises a preferential CUG (pCUG). The pCUG is generally provisioned within the subscriber's profile within the HLR 103 and transferred to the VLR 104, as will be appreciated by those skilled in the art. The default CUG could also be automatically entered by the mobile communication device 106, for example, if there is no pCUG provisioned in the HLR 103 and the default CUG is pre-provisioned on the mobile communication device 106. In another example, the subscriber explicitly selects another CUG (e.g., not the pCUG) to be used for an outgoing call. In this example, the mobile communication device 106 generates a setup message with a request for the CUG selected by the user. The request in one example comprises a CUG index for the selected CUG. For example, each CUG that the subscriber is a member of may be identified by a CUG index, e.g., 0-9. The subscriber's profile in one example comprises a mapping from the CUG index to the corresponding CUG interlock code for the CUGs that the subscriber is a member of.

In one example, the subscriber selects an OA CUG when placing the outgoing call, for example, through the use of a user interface of the mobile communication device 106 or by entering an OA indicator digit sequence. The OA indicator digit sequence in one example comprises an escape digit sequence such as "*9". In another example, the OA indicator digit sequence comprises "*0 1*CUG index*SPC*SOA # DN", where CUG index is a numerical index for the OA CUG index, SPC is an optional numerical indicator to suppress the pCUG, SOA is an optional numerical indicator to suppress the Outgoing Access indicator, and DN is the dialed number. Other implementations of OA indicator digit sequences will be apparent to those skilled in the art. In another example, the subscriber pre-selects the OA CUG for certain calls, for example, calls to a predetermined user (e.g., family member, friend, co-worker) that the subscriber knows is not a member of the default CUG or pCUG. The mobile communication device 106 in one example generates the setup message with an OA CUG index parameter that corresponds to the selected OA CUG IC and optionally a Suppress Preferential CUG (SPC) parameter. In another example, the setup message comprises the escape digit sequence or public network access code as part of a dialed number for the outgoing call. In another example, the mobile communication device 106 is configured to automatically request the default CUG, for example, by automatically placing the OA CUG index parameter in the setup message or automatically prefixing the dialed number with the escape digit sequence.

The HLR 103 in one embodiment is provisioned with an outgoing access CUG interlock code (OA CUG IC) for the outgoing access CUG. When a subscriber requests the outgoing access CUG, the call is allowed, subject to normal CUG subscription checks and special outgoing access CUG interlock code checks as described herein, and flagged as an outgoing access call. Accordingly, a subscriber of the mobile communication device 106 that is not provisioned for outgoing access may request outgoing access on a per-call basis. For example, the default behavior for outgoing calls corresponds to the behavior defined by the pCUG and a billing record for the call is not flagged for outgoing access. When the subscriber wishes to place a call to a non-CUG user, the subscriber may request the outgoing access CUG.

Figure 2:
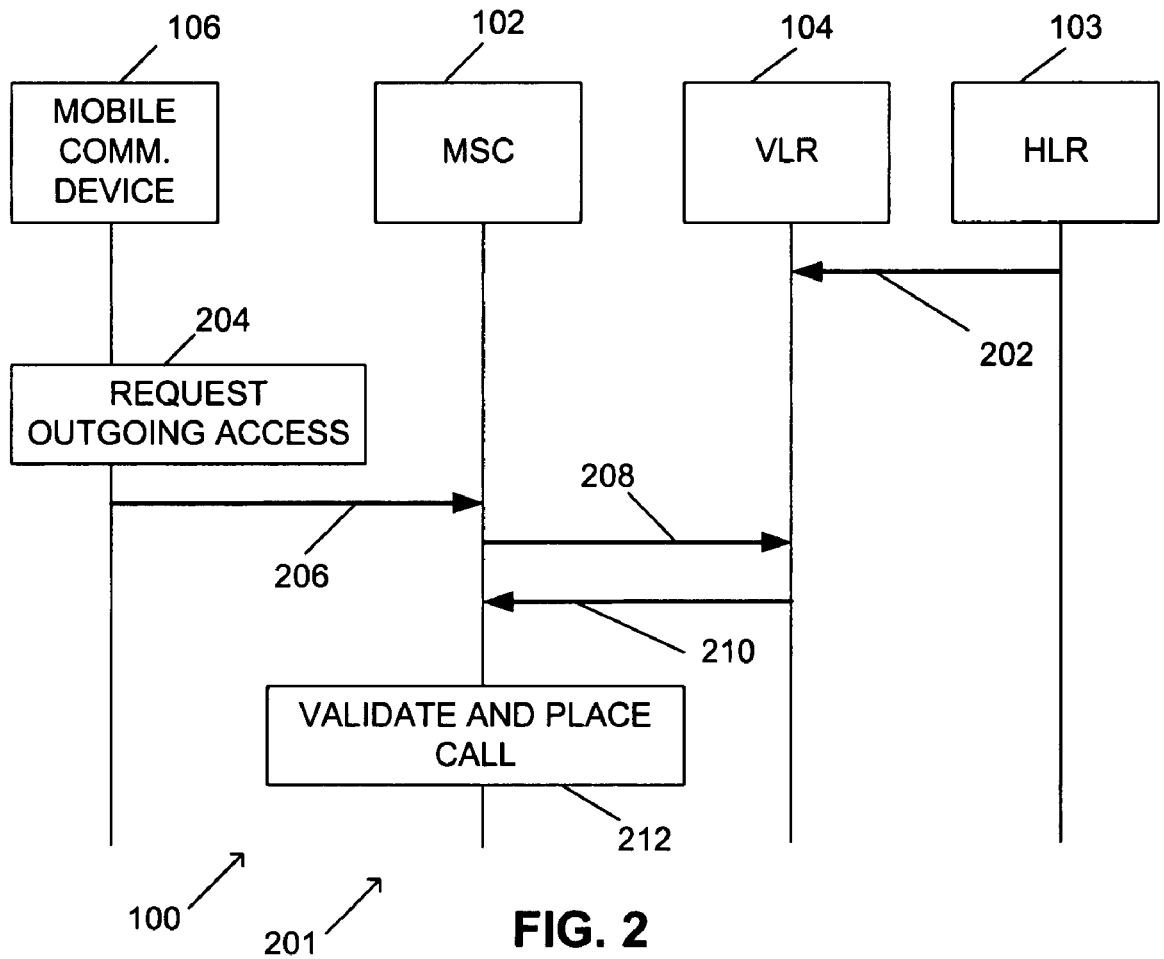
FIG. 2 is a representation of a logic flow for an outgoing call in the apparatus of FIG. 1.

Turning to FIG. 2, an illustrative description of operation of the apparatus 100 is presented as call flow 201, for explanatory purposes. Upon registration of the mobile communication device 106 with the MSC 102/VLR 104, the HLR 103 sends (STEP 202) information from the subscriber's profile to the VLR 104. The subscriber in one example requests (STEP 204) the outgoing access CUG for an outgoing call. As described above, the subscriber may employ the user interface of the mobile communication device 106 to select the outgoing access CUG, enter an escape digit sequence, or the mobile communication device 106 may automatically request the outgoing access CUG based on predetermined criteria (e.g., a dialed number). When an escape digit sequence is entered, the mobile communication device 106 may either convert the escape digit sequence to the OA CUG index parameter or pass the escape digit sequence on as part of the dialed number. The mobile switching center 102 receives (STEP 206) a request for the outgoing access CUG and determines if the outgoing access CUG is valid for the mobile communication device 106. For example, the mobile switching center 102 performs (STEPS 208 and 210) a database lookup of the subscriber's information at the VLR 104 to verify that the subscriber is authorized to use the outgoing access CUG. The VLR 104 in one example translates the OA CUG index from the request into the OA CUG IC, based on the information from the HLR 103, as will be appreciate by those skilled in the art.

Upon validation of the outgoing access CUG, the mobile switching center 102 places (STEP 212) the outgoing call. The mobile switching center 102 in one example is configured to generate a billing record for the call. In a further example, the MSC 102 is configured to cooperate with an offline billing mediation device (not shown). The MSC 102 in one example generates the billing record with a first (i.e. default) billing rate if the outgoing call is placed under the default behavior. If the outgoing call is placed under the outgoing access CUG, the mobile switching center 102 and/or the offline billing mediation device in another example are configured to generate the billing record with a second billing rate. For example, the second billing rate may be higher than the first billing rate. The mobile switching center 102 in one example is configured to send either both an outgoing access indicator and the OA CUG index or neither (e.g., treat the call as a non-CUG call), within inter-switch signaling for calls placed under the outgoing access CUG.

The mobile switching center 102 in one example validates other predetermined network criteria in combination with using the OA CUG interlock code before placing the call. In one example, the mobile switching center 102 checks a call type of the call, for example, circuit switched voice, circuit switched data, or facsimile. In another example, the mobile switching center 102 performs a database lookup to determine if an international mobile subscriber identity (IMSI) of the mobile communication device 106 is within a predetermined list or range of IMSIs. For example, only selected mobile subscribers are allowed to use the OA CUG IC. In yet another example, the mobile switching center 102 determines if, in combination with using the OA CUG interlock code, a roaming agreement exists between a service provider of the mobile switching center 102 and a service provider of a serving mobile switching center (not shown) that the mobile communication device is currently registered with.

Figure 3:
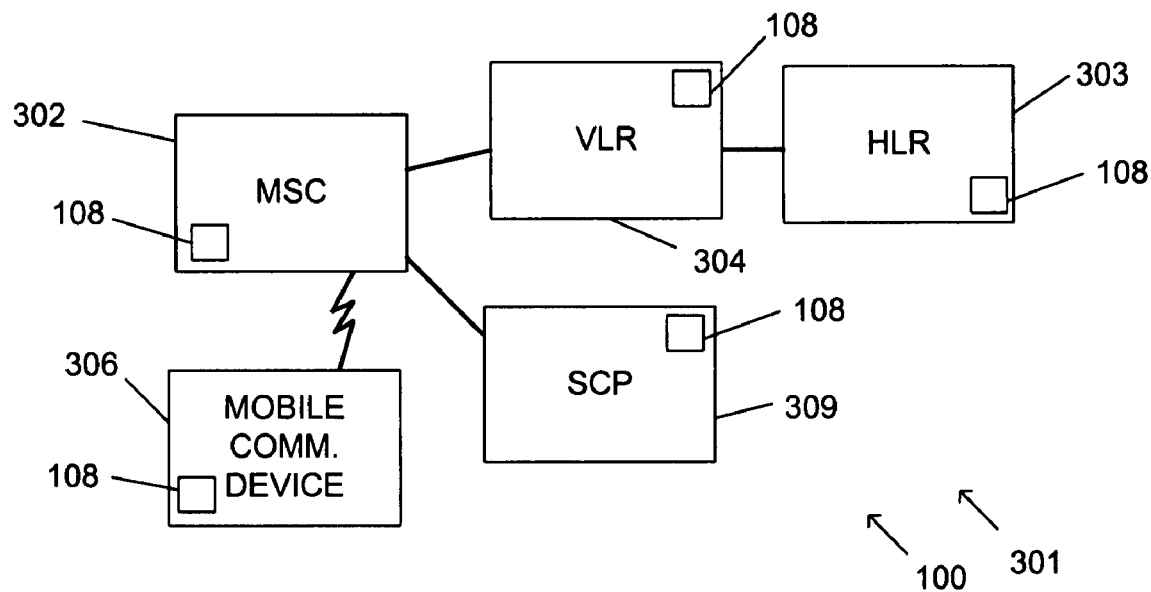
FIG. 3 is a representation of another implementation of the apparatus of FIG. 1 and further comprises a service control point.

Turning to FIG. 3, another embodiment of the apparatus 100 comprises a mobile switching center 302, a home location register 303, a visitor location register 304, a mobile communication device 306, and a service control point (SCP) 309. The MSC 302, HLR 303, VLR 304, mobile communication device 306, and SCP 309 comprise instances of the recordable data storage medium 108, as described herein. The MSC 302, HLR 303, VLR 304, and SCP 309 in one example are part of a communication network 301, for example, a wireless or landline communication network. The MSC 302, HLR 303, VLR 304, and SCP 309 in one example communicate via Customized Applications for Mobile network Enhanced Logic (CAMEL) signaling and may also communicate to other networks, for example, additional instances of the communication network 301, 101, or other communication networks via other signaling protocols, e.g. ISUP. The MSC 302 and VLR 304 in one example comprise portions of a switch, analogous to switch 107, as will be appreciated by those skilled in the art.

Figure 4:
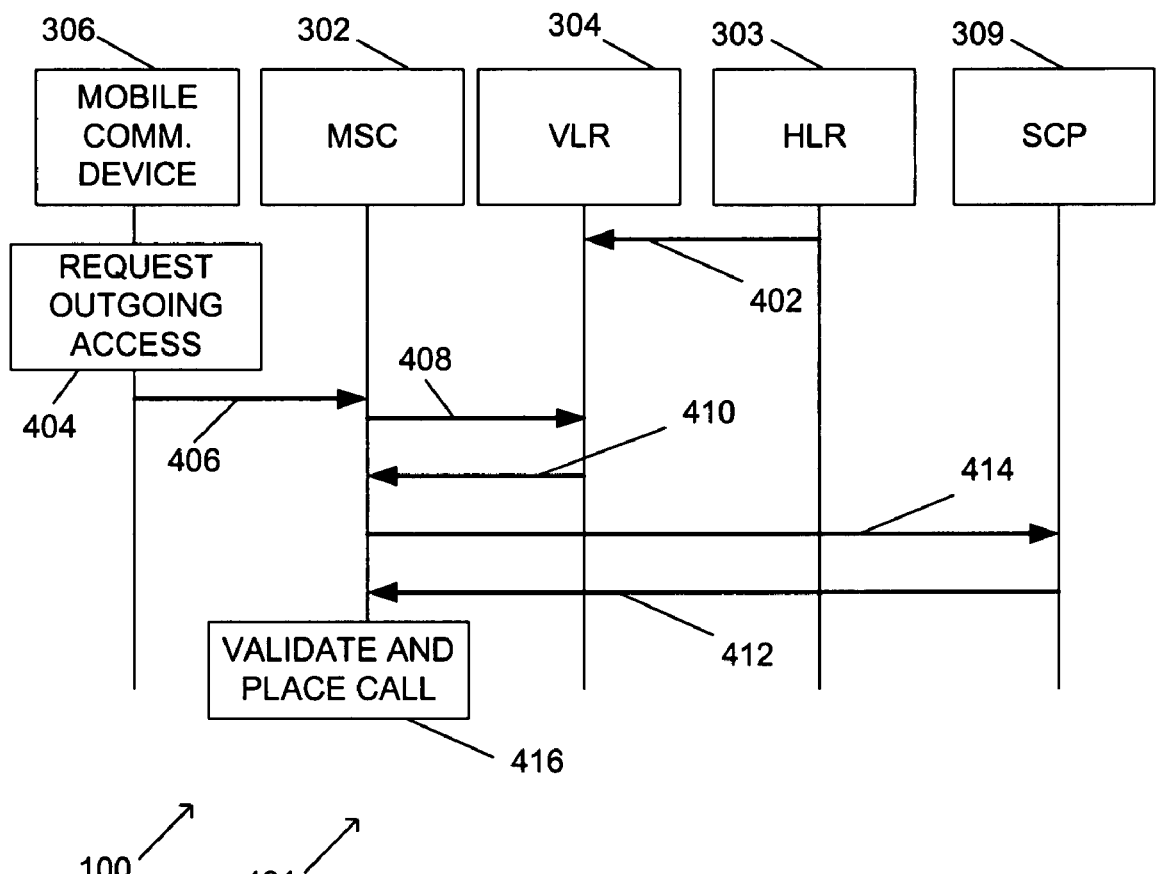
FIG. 4 is a representation of a logic flow for an outgoing call in the apparatus of FIG. 3.

Turning to FIG. 4, an illustrative description of operation of the apparatus 100 for the configuration of FIG. 3 is presented as call flow 401, for explanatory purposes. Upon registration of the mobile communication device 306 with the MSC 302/VLR 304, the HLR 303 sends (STEP 402) information from the subscriber's profile to the VLR 304. The subscriber requests (STEP 404) the outgoing access (e.g., OA CUG index or OA indicator digit sequence) for the outgoing call and the MSC 302 receives (STEP 406) the request, analogously to STEPS 204 and 206. For example, the subscriber or mobile communication device 106 inserts the OA CUG index or OA indicator digit sequence, as described above. The MSC 302 performs a database lookup to validate the call. The MSC 302 in one example performs a local database lookup through the VLR 304 based on input from the HLR 303 in STEPS 408 and 410. These steps may be analogous to STEPS 208 and 210. In an alternative example, the MSC 302 performs a remote database lookup through the SCP 309.

In a first implementation of the remote database lookup, the MSC 302 and SCP 309 support CAMEL phase 1 or CAMEL phase 2. These standards do not support CUG parameters. The SCP 309 in this implementation is provisioned to receive (STEP 412) the escape digit sequence (e.g., as part of the dialed number) and determine that the call is a non-CUG call. The SCP 309 then notifies (STEP 414) the MSC 302 to handle the call as a non-CUG call, for example, by leaving or changing the escape digit sequence to a dialed number. The dialed number may be a unique sequence that is billable as a non-CUG call and overrides the CUG indication in the billing record, as will be appreciated by those skilled in the art.

In a second implementation of the remote database lookup, the MSC 302 and the SCP 309 support phase 3 (or later) of CAMEL. This standard allows modification of the CUG parameters. The SCP 309 in one example receives (STEP 412) the OA CUG index from the mobile communication device 306 in an Initial-DP message and translates the OA CUG index to the OA CUG IC. In another example, the SCP 309 may use the escape digit sequence to determine the OA CUG IC. The SCP 309 may then return (STEP 414) the OA CUG IC and/or the outgoing access indicator to the MSC 302. In another example, the SCP 309 may notify (STEP 414) the MSC 302 to handle the call as a non-CUG call, for example, explicitly via standards method or by any of adding, keeping, changing, or removing the OA indicator digit sequence to/from a dialed number. The OA indicator digit sequence could be interpreted similarly to the CUG standard OA indicator, as will be appreciated by those skilled in the art. The dialed number may contain a unique sequence that is billable as a non-CUG call and overrides the CUG indication in the billing record, as will be appreciated by those skilled in the art. Upon receipt of the OA CUG IC and/or the outgoing access indicator, the MSC 302 can validate and place the call (STEP 416), analogously to STEP 212.

The apparatus 100 in one example comprises a plurality of components such as one or more of electronic components, hardware components, and computer software components. A number of such components can be combined or divided in the apparatus 100. An example component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more implementations of the invention. Examples of a computer-readable signal-bearing medium for the apparatus 100 comprise the recordable data storage medium 108 of the mobile switching centers 102 and 302, the home location register 103 and 303, the visitor location register 104 and 304, the mobile communication device 106 and 306, and the service control point 309. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   a mobile switching center configured to provide a closed user group (CUG) supplementary service to a mobile communication device, wherein the mobile communication device is a member of a default CUG without outgoing access and the mobile communication device is not provisioned for outgoing access;
   wherein the mobile switching center is configured to provide a plurality of CUG interlock codes that correspond to a plurality of closed user groups (CUGs), wherein the plurality of CUG interlock codes comprise at least one outgoing access (OA) CUG interlock code;

wherein the mobile switching center is configured to provide a default behavior according to the default CUG for an outgoing call from the mobile communication device to a default CUG user, wherein the mobile switching center is configured to provide outgoing access to the mobile communication device for an outgoing call to a user that is not a member of the default CUG if a setup message from the mobile communication device for the outgoing call comprises a request for the OA CUG interlock code;

wherein the request for the OA CUG interlock code comprises at least one message parameter;

wherein the at least one message parameter comprises an optional Suppress Preferential CUG (SPC) parameter.

2. The apparatus of claim 1 in combination with a visitor location register, wherein the mobile switching center and the visitor location register are configured to cooperate to provide the CUG supplementary service to the mobile communication device.

3. The apparatus of claim 1, wherein the mobile switching center is configured to provide the outgoing access to the mobile communication device on a per-call basis.

4. The apparatus of claim 3, wherein the mobile switching center is configured to provide the outgoing access based on at least one predetermined network criteria.

5. The apparatus of claim 4, wherein the at least one predetermined network criteria comprises a roaming agreement between a service provider of the mobile switching center and a service provider of a serving mobile switching center that the mobile communication device is registered with.

6. The apparatus of claim 4, wherein the at least one predetermined network criteria comprises a characteristic of the outgoing call.

7. The apparatus of claim 6, wherein the characteristic of the outgoing call comprises a call type of circuit switched voice, circuit switched data, or facsimile.

8. The apparatus of claim 4, wherein the at least one predetermined network criteria comprises a database lookup of the international mobile subscriber identity (IMSI) of the mobile communication device.

9. The apparatus of claim 8, wherein the mobile switching center is configured to determine if the IMSI of the mobile communication device is within a provisioned list or range of IMSIs.

10. The apparatus of claim 1, wherein the at least one message parameter comprises an OA CUG index, wherein the OA CUG index corresponds to the OA CUG interlock code.

11. The apparatus of claim 10, wherein the mobile switching center performs a database lookup to translate the OA CUG index to the OA CUG interlock code.

12. The apparatus of claim 1, wherein the request for the OA CUG interlock code comprises an escape digit sequence.

13. The apparatus of claim 12, wherein the escape digit sequence is interpreted similarly to the CUG standard OA indicator.

14. The apparatus of claim 1, wherein the mobile switching center is configured to cooperate with a billing mediation device to generate a billing record with a first billing rate for the outgoing call placed under the default behavior;

wherein the mobile switching center is configured to cooperate with the billing mediation device to generate the billing record with an outgoing access flag and a second billing rate for the outgoing call placed with the request for the OA CUG interlock code.

15. The apparatus of claim 1, wherein the mobile switching center is configured to receive the plurality of CUG interlock codes from a home location register that comprises a subscriber profile for the mobile communication device, wherein the home location register is provisioned with the plurality of CUG interlock codes.

16. The apparatus of claim 1, in combination with a service control point, wherein the mobile switching center is configured to perform a remote database lookup through the service control point;

wherein the remote database lookup comprises an exchange of at least one of an OA flag, an OA CUG index, the OA CUG interlock code, an escape digit sequence, and a dialed number;

wherein the service control point is configured to at least one of:

add, modify, keep, and/or remove and then return to the mobile switching center at least one of the OA flag, the OA CUG index, the OA CUG interlock code, the escape digit sequence and the dialed number;

return the OA CUG IC to the mobile switching center; and/or return an OA flag to the mobile switching center.

17. A method, comprising the steps of:

receiving a call setup message for an outgoing call from a mobile communication device, wherein the mobile communication device is a member of a default closed user group (CUG) without outgoing access and the mobile communication device is not provisioned for outgoing access, wherein the call setup message comprises a request for an outgoing access (OA) CUG interlock code, wherein the outgoing call is to a user that is not a member of the default CUG, wherein the request for the OA CUG interlock code comprises an optional Suppress Preferential CUG (SPC) parameter;

performing a database lookup to determine that the OA CUG interlock code is valid for the mobile communication device;

establishing the outgoing call for the mobile communication device; and generating a billing record for the outgoing call at an outgoing billing rate that is distinct from a default CUG billing rate.

18. The method of claim 17, wherein the step of performing the database lookup to determine that the OA CUG interlock code is valid for the mobile communication device comprises at least one of the steps of:

determining that the mobile communication device is served by a mobile switching center with a roaming agreement;

determining that the call type of the outgoing call is circuit switched voice, circuit switched data, or facsimile; and determining that an international mobile subscriber identifier (IMSI) of the mobile communication device is valid for use of the OA CUG interlock code.

19. The method of claim 17, wherein the request for the OA CUG interlock code comprises an OA CUG index, wherein the step of performing the database lookup to determine that the OA CUG interlock code is valid for the mobile communication device comprises the step of:

performing a database lookup to translate the OA CUG index to the OA CUG interlock code.

20. The method of claim 19, wherein the step of performing the database lookup to translate the OA CUG index to the OA CUG interlock code comprises the step of:

sending a request to a service control point, wherein the request comprises at least one of:

a OA CUG index that corresponds to the OA CUG interlock code;

an escape digit sequence; and a dialed number.

21. The method of claim 20, wherein the step of performing the database lookup to translate the OA CUG index to the OA CUG interlock code comprises the step of:
receiving a response from the service control point, wherein the response comprises at least one of:
a modified CUG index;
a modified escape digit sequence;
a modified dialed number;
the OA CUG IC; and
an outgoing access flag.

22. An article, comprising:
one or more computer-readable signal-bearing media; and
means in the one or more media for receiving a call setup message for an outgoing call from a mobile communication device, wherein the mobile communication device is a member of a default closed user group (CUG) without outgoing access and the mobile communication device is not provisioned for outgoing access, wherein the call setup message comprises a request for an outgoing access (OA) CUG interlock code, wherein the request for the OA CUG interlock code comprises an optional Suppress Preferential CUG (SPC) and an OA CUG index, wherein the outgoing call is to a user that is not a member of the default CUG;
means in the one or more media for performing a database lookup to determine that the OA CUG interlock code is valid for the mobile communication device;
means in the one or more media for establishing the outgoing call for the mobile communication device; and
means in the one or more media for generating a billing record for the outgoing call at an outgoing billing rate that is distinct from a default CUG billing rate;
wherein the means in the one or more media for performing the database lookup to determine that the OA CUG interlock code is valid for the mobile communication device comprises:
means in the one or more media for performing a database lookup to translate the OA CUG index to the OA CUG interlock code.

23. The article of claim 22, wherein the means in the one or more media for performing the database lookup to determine that the OA CUG interlock code is valid for the mobile communication device comprises:
means in the one or more media for determining that the mobile communication device is served by a mobile switching center with a roaming agreement;
determining that the call type of the outgoing call is circuit switched voice, circuit switched data, or facsimile; and
determining that an international mobile subscriber identifier (IMSI) of the mobile communication device is valid for use of the OA CUG interlock code.

* * * * *